US009857939B2

(12) United States Patent
Webb et al.

(10) Patent No.: US 9,857,939 B2
(45) Date of Patent: Jan. 2, 2018

(54) THREE-DIMENSIONAL VIRTUALIZATION

(71) Applicant: Accenture Global Services Limited, Dublin (IE)

(72) Inventors: Sunny M. Webb, San Francisco, CA (US); Matthew Thomas Short, San Jose, CA (US); Robert P. Dooley, Castro Valley, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 206 days.

(21) Appl. No.: 14/634,274

(22) Filed: Feb. 27, 2015

(65) Prior Publication Data
US 2016/0253067 A1    Sep. 1, 2016

(51) Int. Cl.
| | |
|---|---|
| *A63F 13/63* | (2014.01) |
| *G06F 3/0481* | (2013.01) |
| *G06F 9/44* | (2006.01) |
| *G06F 3/0486* | (2013.01) |
| *G06F 3/0488* | (2013.01) |
| *G06F 3/0484* | (2013.01) |
| *G06F 3/0482* | (2013.01) |
| *A63F 13/00* | (2014.01) |

(52) U.S. Cl.
CPC .......... *G06F 3/04815* (2013.01); *A63F 13/00* (2013.01); *G06F 3/0482* (2013.01); *G06F 3/0486* (2013.01); *G06F 3/0488* (2013.01); *G06F 3/04842* (2013.01); *G06F 3/04883* (2013.01); *G06F 8/34* (2013.01); *A63F 2300/6018* (2013.01); *G06F 2200/1637* (2013.01)

(58) Field of Classification Search
None
See application file for complete search history.

(56) References Cited

U.S. PATENT DOCUMENTS

| | | | |
|---|---|---|---|
| 5,495,576 A | * | 2/1996 | Ritchey .................. G06T 17/00 345/420 |
| 7,574,381 B1 | | 8/2009 | Lin-Hendel |
| 8,570,329 B1 | | 10/2013 | Ofstad |

(Continued)

FOREIGN PATENT DOCUMENTS

| | | |
|---|---|---|
| EP | 2453210 A1 | 5/2012 |
| WO | 2015/027105 A1 | 2/2015 |

OTHER PUBLICATIONS

Fitzmaurice G W et al: "Virtual Reality for Palmtop Computers", ACM Transactions on Information Systems, vol. 11, No. 3, Jul. 1, 1993, pp. 197-218.

(Continued)

*Primary Examiner* — Jason Yen
(74) *Attorney, Agent, or Firm* — Mannava & Kang, P.C.

(57) ABSTRACT

Three-dimensional virtualization may include receiving captured images of an entity and/or a scene, and/or capturing the images of the entity and/or the scene. The images may be connected in a predetermined sequence to generate a virtual environment. A virtual reality application may be generated to implement controls for manipulation of the virtual environment. Gestures related to a view generated by the virtual reality application may be received. The gestures may be translated to manipulate the view generated by the virtual reality application.

20 Claims, 10 Drawing Sheets

(56) References Cited

U.S. PATENT DOCUMENTS

| | | | |
|---|---|---|---|
| 9,158,414 B1 * | 10/2015 | Gluzberg | G06F 3/0418 |
| 2007/0070066 A1 * | 3/2007 | Bakhash | G06F 3/04815 |
| | | | 345/419 |
| 2008/0214214 A1 * | 9/2008 | Reissmueller | G06F 3/0486 |
| | | | 455/466 |
| 2010/0085356 A1 * | 4/2010 | Nie | G06T 15/205 |
| | | | 345/419 |
| 2010/0281438 A1 * | 11/2010 | Latta | A63F 13/42 |
| | | | 3/42 |
| 2013/0346916 A1 | 12/2013 | Williamson et al. | |
| 2014/0157206 A1 | 6/2014 | Ovsiannikov et al. | |
| 2015/0277746 A1 * | 10/2015 | Wu | G06F 3/04845 |
| | | | 715/771 |

OTHER PUBLICATIONS

Rekimoto J: "Tilting Operations for Small Screen Interfaces", UIST '96, 9th Annual Symposium on User Interface Software and Technology, Nov. 6, 1996, pp. 167-168.

Steed A: "Towards a General Model for Selection in Virtual Environments", 3DU1 2006: IEEE Symposium on 3D User Interfaces 2006, Mar. 25, 2006, pp. 103-110.

Esperient: "Esperient Creator and Google SketchUp", Mar. 11, 2009, 1 page.

* cited by examiner

THREE-DIMENSIONAL VIRTUALIZATION

BACKGROUND

Virtual reality may include displaying a simulated three-dimensional view of an entity or a simulated three-dimensional view of a scene. The entity may include a person, and generally anything that may be captured in an image. The scene may include one or more entities. Virtual reality may be used to simulate physical presence in real or imagined environments.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
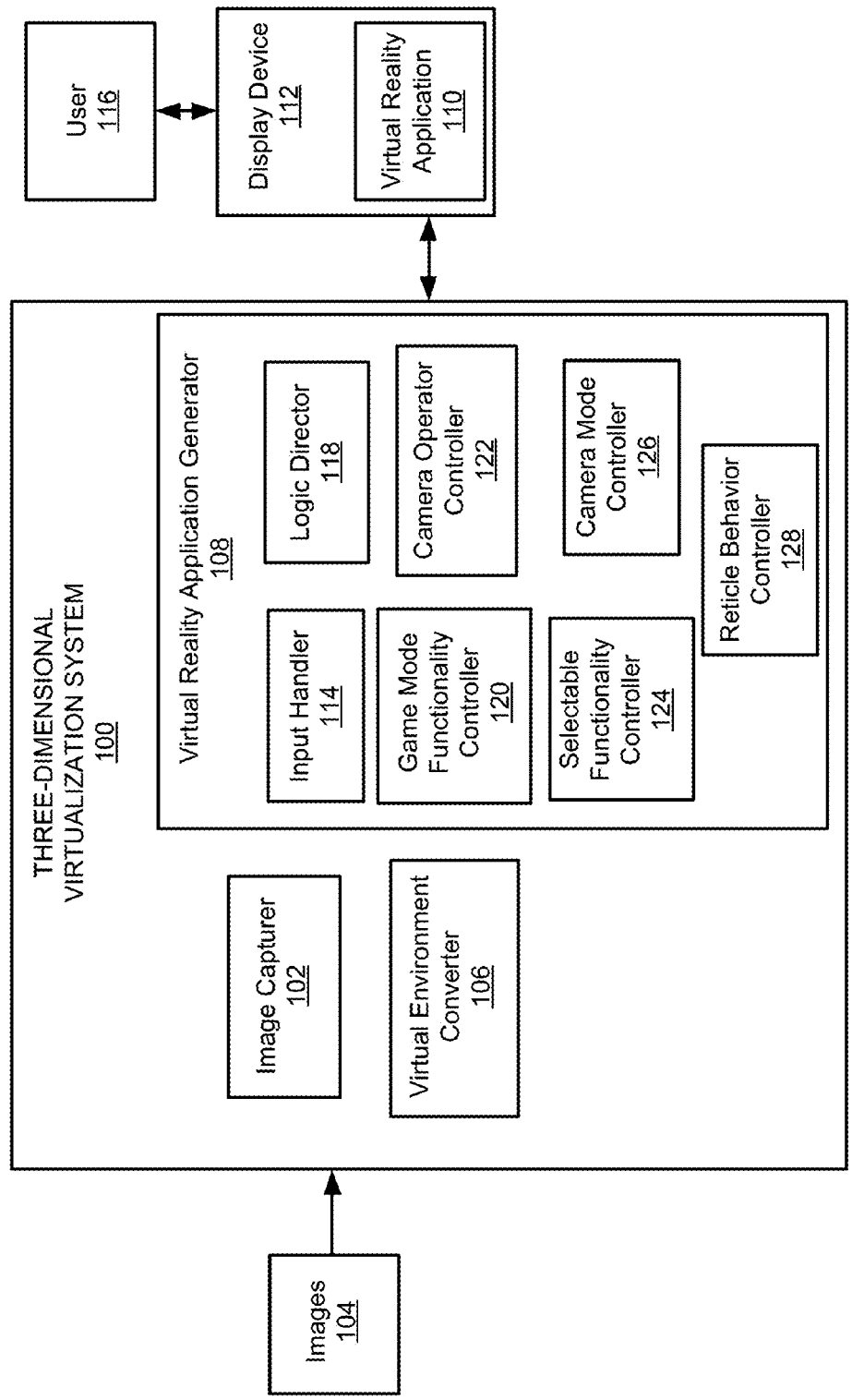
FIG. 1 illustrates a detailed architecture of a three-dimensional virtualization system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples, a three-dimensional virtualization system and a method for three-dimensional virtualization are disclosed herein. The system and method disclosed herein may provide a framework to receive captured images and/or to capture images of an entity (e.g., a person, etc.), and/or a scene. The captured images may be converted into a virtual environment. The virtual environment may be described as a plurality of images that are stitched or otherwise connected together in a predetermined sequence. A virtual reality application may be generated to implement various controls (gyroscope-based, finger-based, etc.) for manipulation of the virtual environment. The virtual reality application may include or be used to generate a photosphere view of the virtual environment, where the photosphere view includes the various implemented controls. Further, the virtual reality application may include or be used to implement a virtual reality view of the virtual environment by generating a photosphere virtual reality view. A display device (e.g., a personal computer, tablet, smartphone, etc.) may be used with a three-dimensional viewing device (e.g., a device that includes left eye and right eye lenses to generate a virtual reality view when the display device is used with the three-dimensional viewing device) to display a virtual reality view of the photosphere virtual reality view.

According to an example, the virtual reality application may include a map screen to guide a user of the virtual reality application with respect to display of the captured images in a photosphere view, and/or a photosphere virtual reality view. For the map screen, a pin on the map screen may be selected (e.g., by a finger-based selection, or a targeting reticle-based selection as described herein) to view an associated photosphere view. The photosphere view may be manipulated, for example, to rotate the view left, right, up, down, zoom, etc.

The photosphere virtual reality view may include a left view (e.g., for a left eye of a user), and a right view (e.g., for a right eye of the user). The three-dimensional viewing device that may be used to display a virtual reality view of the photosphere virtual reality view may include a left eye lens for a left eye of the user, and a right eye lens for a right eye of the user.

The map, the photosphere view, and/or other game mode views may include a content flag. The content flag may be described as an indicator that may be used to display additional information with respect to an area of interest associated with the content flag. For example, if an entity that is displayed in the map, the photosphere view, and/or the photosphere virtual reality view includes a bridge, the content flag may be disposed adjacent the bridge. When a user selects the content flag (e.g., by touching the content flag), additional information with respect to the bridge may be displayed.

The targeting reticle may be used during viewing of the map, the photosphere view, and/or the photosphere virtual reality view. For example, during viewing of the photosphere virtual reality view, a user may rotate the three-dimensional viewing device to visually position the targeting reticle over an area of interest. Once the targeting reticle is positioned such that the area of interest is within the targeting reticle, an entity (or scene) with respect to the area of interest may displayed and/or further action with respect to the entity (or scene) may be initiated. For example, a targeting reticle may be used to select a content flag by placing the content flag within the targeting reticle, and after a predetermined time period (e.g., three seconds), the content flag may be activated to display further information related to the content flag.

The virtual reality application may include mobile virtual reality applications, on-line virtual reality applications, and other types of virtual reality applications. A user may operate the virtual reality application to interact with the environment that is being viewed by using the virtual reality application. For example, a user may also operate the virtual reality application to view further information with respect to features associated with the environment.

The three-dimensional virtualization system and the method for three-dimensional virtualization disclosed herein provide a technical solution to technical problems related, for example, to generation of virtual reality applications to implement controls for manipulation of a virtual environment. For example, in order to generate a virtual reality application, a user may capture images, attempt to create a virtual environment, attempt to implement various controls in the virtual reality application by writing machine readable instructions, and attempt to generate different views in the virtual reality application to view and/or manipulate the virtual environment. However, generation of a virtual reality application that accounts for different virtual environments, different views that are needed by a user, and different gestures that are to be captured by the virtual reality application is not technically feasible. Based on the drag and drop implementation as described herein, a virtual reality application may be generated by dragging and dropping various images and instructions related to the virtual reality application in a scene generated by the virtual reality application generator as disclosed herein. In this regard, the generation of a virtual reality application is expedited. Editing of a virtual reality application is also expedited as any modifications related to the virtual reality application may be dragged, dropped, and/or removed from the scene generated by the virtual reality application generator. Thus, the system and method disclosed herein also provides the technical solution of reducing inefficient processing related to generation and/or modification of a virtual reality application.

Figure 4:
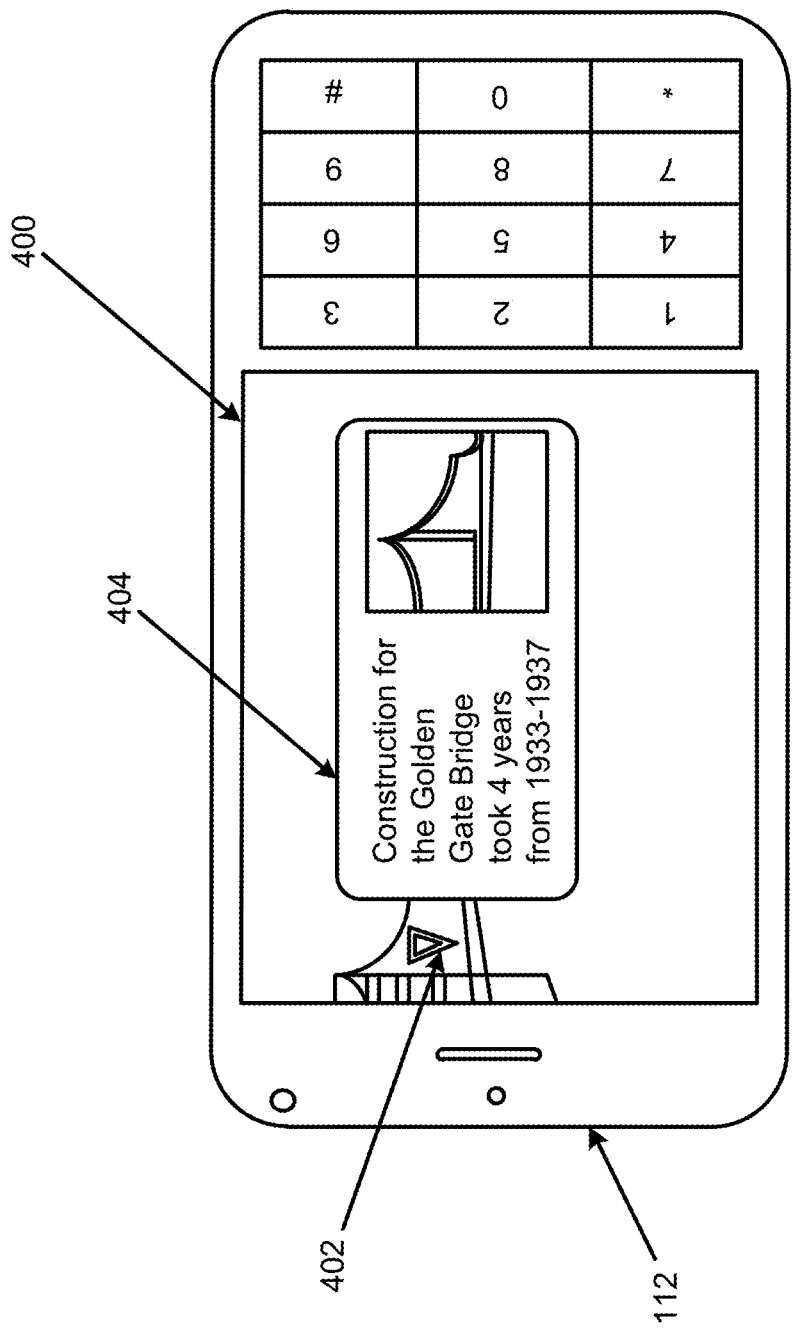
FIG. 4 illustrates a user-interface display of a photosphere view for the virtual reality application generated by the three-dimensional virtualization system of FIG. 1, according to an example of the present disclosure.
Figure 5:
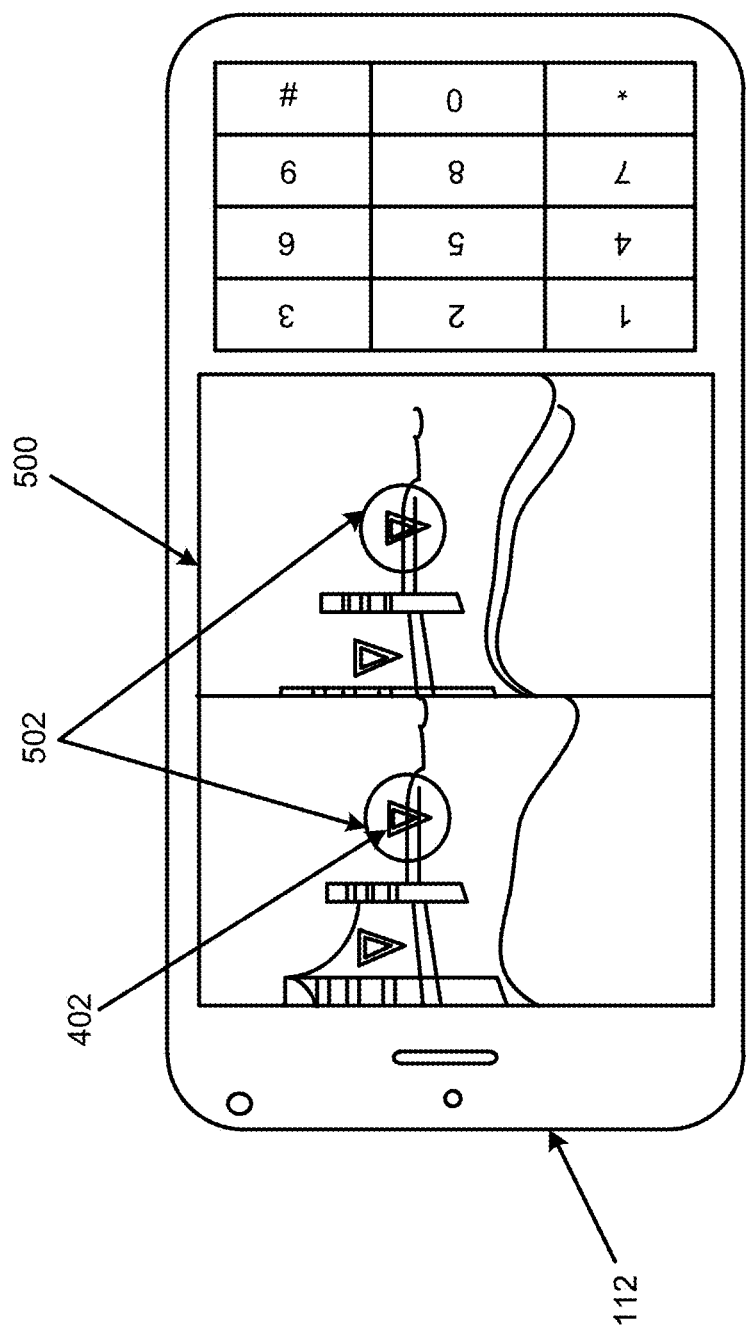
FIG. 5 illustrates a user-interface display of a photosphere virtual reality view for the virtual reality application generated by the three-dimensional virtualization system of FIG. 1, according to an example of the present disclosure.

FIG. 1 illustrates a detailed architecture of a three-dimensional virtualization system 100, according to an example of the present disclosure. The system 100 may include a hardware implemented image capturer 102 to receive captured images 104 and/or to capture images 104 of an entity (e.g., a person, etc.) and/or scenery. For example, the image capturer 102 may capture a plurality of the images 104 based on a rotation of a camera along a generally fixed axis. The captured images 104 may be converted into a virtual environment (e.g., by stitching or otherwise connecting the captured images in a predetermined sequence into a single texture of the environment) by a hardware implemented virtual environment converter 106. A hardware implemented virtual reality application generator 108 may generate a virtual reality application 110 to implement various controls (gyroscope-based, finger-based, etc.) for manipulation of the virtual environment. As shown in FIG. 4, the virtual reality application 110 may include or be used to generate a photosphere view 400 of the virtual environment, where the photosphere view 400 may include the various implemented controls. Further, as shown in FIG. 5, the virtual reality application 110 may include or be used to implement a virtual reality view of the virtual environment by generating a photosphere virtual reality view 500. A display device 112 (e.g., a personal computer, tablet, smartphone, etc.) may be used with a three-dimensional viewing device (not shown) to display a virtual reality view of the photosphere virtual reality view 500.

A hardware implemented input handler 114 may generally control functions related to the virtual reality application 110. Examples of the functions may include a display of characteristics related to a photosphere view, movement control related to the photosphere view, selection/editing of content related to the photosphere view, etc. The input handler 114 may generally receive touch gestures from a user 116 of the display device 112, and translate the touch gestures into information that is understandable by the other components of the system 100. The touch gestures may include, for example, sliding of a finger across a display of the display device 112, tapping of the display of the display device 112, etc. For example, FIG. 4 illustrates a user-interface display of a photosphere view 400 for the virtual reality application 110, according to an example of the present disclosure. Referring to FIGS. 1 and 4, the input handler 114 may translate the selection of a content flag 402 when a user touches the content flag 402 to a request to display content 404 associated with the content flag 402.

FIG. 5 illustrates a user-interface display of the photosphere virtual reality view 500 for the virtual reality application 110, according to an example of the present disclosure. Referring to FIGS. 1 and 5, according to another example, the input handler 114 may translate a selection of the content flag 402 (or another area of interest) when a targeting reticle 502 is positioned to select the content flag 402 into a request to display the content 404 associated with the content flag 402, or otherwise activate the content flag 402 or a process associated with the content flag 402. For example, a process associated with the content flag 402 may include shifting to another photosphere view, shifting to another photosphere virtual reality view, displaying a map, or generally any specified function of the virtual reality application 110.

The input handler 114 may receive input from the user 116 of the display device 112, and forward the input to a hardware implemented logic director 118. The input handler 114 may read input, for example, from touch gestures, personal computer (PC) keys, linger-based selection, and/or screen tilts of the display device 112 and/or a three-dimensional viewing device. The linger-based selection may be related to a virtual reality mode that uses the photosphere virtual reality view, where the targeting reticle 502 is disposed (i.e., hovered) over a selectable object (e.g., the content flag 402) for a predetermined time period. A screen tilt of the display device 112 may be used, for example, to revert from a virtual reality mode (e.g., a mode that uses the photosphere virtual reality view) to a home screen (e.g., a map view). For example, a landscape orientation of the display device 112 may be used for photosphere virtual reality viewing, whereas a screen tilt of the display device 112 may be used to revert to a map view (or photosphere view), and vice-versa.

The logic director 118 may implement the logic associated with the system 100 to receive input from the user 116 (via the input handler 114) of the display device 112, and determine an action associated with the input. For example, the logic director 118 may receive input from the user 116 of the display device 112, and based on a set of rules, determine an action associated with the input. For example, the set of rules may include rules to provide for movement between different photosphere views, rotation of photosphere views, setup of the map and pins associated with the map, etc. For example, a left/right input in a landscape orientation of the display device 112 may provide for rotation of a photosphere view. Other examples of rules may include panning the view of the map from side to side, and preventing the view of the map from panning outside of the limits of a display screen, scaling the view of the map larger or smaller, opening a map pin and moving from the map view into a photosphere view, rotating the photosphere view around a fixed point, opening or closing a content flag, returning to the map view from a photosphere view, changing the control mode in between virtual reality, finger, and gyroscope modes, etc.

The logic director 118 may determine whether an input by the user 116 is valid or invalid. For example, the logic director 118 may query a hardware implemented game mode functionality controller 120 and/or a hardware implemented camera operator controller 122 to determine whether an input is valid or invalid. With respect to inputs that may be respectively checked for validity with respect to the game mode functionality controller 120, and the camera operator controller 122, according to an example, if the camera operator controller 122 reports that the virtual environment is currently being rendered in a finger-based control mode, a linger-based selection with a targeting reticle may be considered invalid. Examples of control modes may include gyroscopic-based control mode, finger-based control mode, linger-based control mode, etc.

The logic director 118 may also forward an input by the user 116 to the game mode functionality controller 120, the camera operator controller 122, and/or a hardware implemented selectable functionality controller 124 depending on the specifics of the input. For example, the logic director 118 may forward an input that includes a touch and drag input, where the application user 116 has touched the screen of the display device 112 executing the application and dragged their finger across the screen of the display device 112. Information about this input may be captured by the input handler 114, passed to the logic director 118, and then passed to the game mode functionality controller 120. If the current game mode indicates that the user was in a photosphere view, the current game mode may attempt to rotate the camera around inside of the current game mode. If the current game mode instead indicates that the user was looking at the map view, the current game mode may pan the map.

Figure 3:
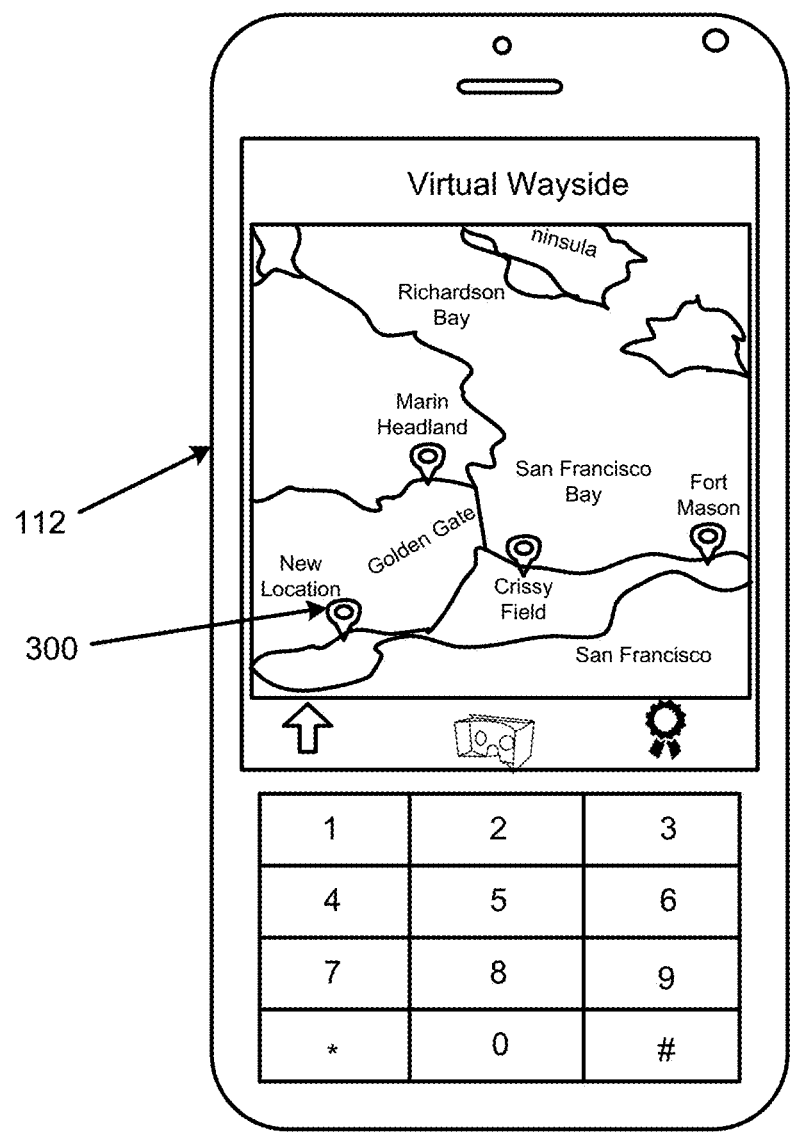
FIG. 3 illustrates a main user-interface display of a map for the virtual reality application generated by the three-dimensional virtualization system of FIG. 1, according to an example of the present disclosure.

The selectable functionality controller 124 may implement the selection of various selectable objects in each of a plurality of game modes. Examples of game modes that may be used with the selectable functionality controller 124 may include a map view game mode, a photosphere view game mode, a welcome screen game mode, etc. Generally, the game modes may include any type of view that is displayed by the virtual reality application 110. FIG. 3 illustrates a main user-interface display of a map for the virtual reality application 110, according to an example of the present disclosure. Referring to FIGS. 1 and 3, for a map view game mode of FIG. 3, selectable objects may include the pin 300. According to another example, in a photosphere view game mode of FIG. 4, selectable objects may include the content flag 402.

The selectable functionality controller 124 may implement different types of functionality to the selectable objects, based, for example, on the attributes of the selectable objects, and/or the particular game mode that the selectable objects are being used in. For example, for the map view game mode of FIG. 3 where selectable objects may include the pin 300, if the pin 300 is selected by the user 116, a photosphere view (see FIG. 4) associated with the pin 300 may be generated. According to another example, for the photosphere view game mode of FIG. 4 where selectable objects may include the content flag 402, if the content flag 402 is selected by the user 116, the annotated content 404 associated with the content flag 402 may be displayed. According to another example, the content flag 402 may trigger the movement into another photosphere instead of the display of the annotated content 404. For example, after selection of the selectable object, the exit( ) technique of the current game mode view may be called, the enter( ) technique of the new game mode view may be called, and the view may transition to a new scene. According to an example, a selectable object may take a different physical shape, such as an arrow, to indicate this difference in functionality. To further illustrate this example, referring to FIG. 4, a selectable object in the shape of an arrow may be placed in the photosphere scene of "Crissy Field", pointing down a road in the direction of the "Golden Gate Bridge". When the arrow is selected, the current virtual environment may change from "Crissy Field" to the "Golden Gate Bridge".

The selectable functionality controller 124 may be called from the logic director 118, and an OnActivate( ) function for the selectable functionality controller 124 may call the logic director 118. The OnActivate( ) function may be used to implement a predetermined behavior for a selectable object. For example, the behavior of the OnActivate( ) function for a content flag may include displaying the related content. In the example of FIG. 4, the OnActivate( ) function of the content flag 402 is to toggle the display of its annotated content 404. Each selectable object may include the OnActivate( ) function that is attached thereto to implement the predetermined behavior. When the logic director 118 determines that the selectable object has been selected, the OnActivate( ) function may be called to implement the predetermined behavior of the selectable object.

With respect to the input handler 114, the logic director 118, and the selectable functionality controller 124, if a selectable object on a device screen is touched by the user 116, the touch may be first processed by the input handler 114, and then received by the logic director 118 where the logic director 118 may call a function of the selectable object to perform an associated task (e.g., display additional content) associated with the selectable object.

The game mode functionality controller 120 may control functionality associated with different views generated by the virtual reality application 110. Each stage of the virtual reality application 110 may be associated with a different game mode. For example, a map view may be associated with a different game mode (i.e., a map view game mode) as compared to a photosphere view (i.e., a photosphere view game mode). Further, functionality associated with a map may also be associated with the map view game mode compared to functionality associated with the photosphere view game mode. The functionality associated with different game modes may be based on different rules that govern operations that may be performed by a user for a particular game mode (e.g., with a map view versus a photosphere view). For example, the rules may control the way touch and drag inputs are handled in a map view game mode versus a photosphere view game mode.

The particular game mode may be used to determine actions that are to be performed with respect to an input, such as drag or zoom inputs. For example, a drag input in a photosphere view game mode may be used to move a photosphere view, and a zoom input in the photosphere view game mode may be used to enlarge or reduce a photosphere view. The game mode may also request changes from the camera. For example, when in the map game mode in gyroscope-based control, the game mode may request that the camera stay facing forward and looking at the map. This change request may override the default behavior of the gyroscope-based camera, but may be desired behavior because the map is not a three dimensional sphere extending around the camera. In this example, a photosphere may represent an entire virtual environment.

The logic director 118 may include a currentGameMode variable where the current game mode is stored. For example, the currentGameMode variable may be used to store a different variable (i.e., a pointer) for a photosphere game mode versus a map game mode. The currentGameMode variable may be used to identify a particular game mode by components of the system 100.

The game mode functionality controller 120 may include a plurality of functions, such as, for example, reset( ), enter( ), exit( ), drag( ), and twotouch( ). The reset( ) function may provide for the resetting of a particular game mode to a predetermined configuration. For example, a map game mode may be reset to a predetermined configuration, where any edits and/or manipulations by the user 116 may be reverted back to the predetermined configuration (e.g., a configuration upon start of the virtual reality application 110). The enter( ) and exit( ) functions may respectively represent an entry into and an exit from a game mode. For example, commencement of a map game mode may represent entry into the map game mode, and entry into a photosphere view game mode from the map game mode may represent exit from the map game mode, and entry into the photosphere view game mode. The drag( ) and twotouch( ) functions may be used to respectively indicate to the logic director 118 how to handle a touch and drag, and a two touch gesture on a display of the display device 112. For example, the input handler 114 may identify a touch and drag, or a two touch gesture on a display of the display device 112, and forward the information related to the gesture to the logic director 118. The logic director 118 may notify the game mode functionality controller 120 of the touch and drag gesture (e.g., from a first coordinate to a second coordinate) or two touch gesture (e.g., at a given coordinate) to determine an operation that is to be performed in response to the particular gesture.

The camera operator controller 122 may implement different camera settings for the different game modes. For example, a map view, a photosphere view, and the photosphere virtual reality view may each utilize different camera configurations. Examples of configurations may include finger-based control where the camera is controlled by finger swipes on the display device 112, gyroscope-based control where the camera is controlled primarily by the physical orientation of the display device 112 in the real world, and virtual reality enabled control where the camera is controlled primarily by the physical orientation of the display device 112 in the real world, and two views, a left eye and right eye, may be rendered to enable a three-dimensional stereoscopic experience. The camera operator controller 122 may operate in conjunction with the logic director 118 to switch between different views available for the virtual reality application 110. For example, the camera operator controller 122 may operate in conjunction with the logic director 118 to switch between photosphere and photosphere virtual reality views for the virtual reality application 110.

The logic director 118 or the game mode functionality controller 120 may call the camera operator controller 122 and request changes. For example, the user 116 may select an option (e.g., displayed on the display device 112) for the virtual reality application 110 to change the view mode from finger-based to gyroscope-based. That option may be captured by the input handler 114, which will pass the option to the logic director 118, which will request the change of the camera. The logic director 118 may also change functionality of a hardware implemented camera mode controller 126. The game mode functionality controller 120 may change a camera's angle. The camera operator controller 122 may be used in the selection of the input handler 114 to raycast linger selection. For example, in a photosphere virtual reality view mode, when using a targeting reticle, hovering over an object may be determined as a selection of the object. This selection of the object may be considered as an input to the input handler 114, where the input handler 114 may need to determine where the camera is pointed. That is, the camera operator controller 122 may indicate to the input handler 114 where the camera is pointed to so that the input handler 114 may determine if a linger-based selection is being performed on an object.

The camera operator controller 122 may pass orders to the activeCamera through its manipulation techniques. For example, the camera operator controller 122 may manipulate an entity in the virtual reality environment that represents a camera, where other entities in a scene may be rendered at specific coordinates from the manipulated entity, and along a specific vector relative to the manipulated entity.

The camera operator controller 122 may also be responsible for cleanly switching cameraControl states. For example, similar to the game mode functionality controller 120 switching game states using enter( ) and exit( ) techniques, the camera may transition between states using its own enter( ) and exit( ) techniques. When switching from virtual reality camera mode to finger-based camera mode, the virtual reality camera mode's exit( ) technique may be executed to hide the targeting reticle, and deactivate the left and right eye cameras. Then the finger-based camera mode's enter( ) technique may be called to turns on the main camera.

The camera operator controller 122 may hold the reference to the targeting reticle. Since the display of the targeting reticle is controlled by whether or not the virtual reality camera mode is being executed, the camera operator controller 122 may store a variable (pointer) for the targeting reticle, and send the targeting reticle commands (for example, about when to animate).

The camera operator controller 122 may utilize techniques such as activeCamera, SwitchControls( ), manipulateReticle( ), and SetPosition to identify a current camera mode. For example, activeCamera may represent a finger mode (or another mode of the camera). A switch to another mode (e.g., a gyroscope-based mode) may be identified by a SwitchControls( ) technique. The manipulateReticle( ) technique may be used to animate the targeting reticle according to how long the targeting reticle has been lingering over a selectable object. The SetPosition( ) technique may be used to move the camera from one place to another. For example, the game mode may call SetPosition( ) when first entering the game mode to move the camera to the correct spot. When entering a photosphere from the map, SetPosition may be called to move the camera from sitting in front of the map to sitting in the middle of the photosphere.

A hardware implemented camera mode controller 126 may operate in conjunction with the camera operator controller 122 to control a mode of a specific camera being used. The camera mode controller 126 may include camera modes that include a gyroscope mode, a finger mode, and a virtual reality mode. The gyroscope mode may operate by movement of the display device 112, where the scene that is being viewed may move based on movement of the display device 112. The finger mode may be based on touching and dragging of a finger by the user 116 across a screen of the display device 112 to rotate a view being displayed. The virtual reality mode may be based on viewing of the photosphere virtual reality view 500 in different directions (e.g., left or right), when the display device 112 is placed in a three-dimensional viewing device. Examples of game modes that may be used with the camera mode controller 126 may include a photosphere view game mode, a map view game mode, etc. In the photosphere view game mode of FIG. 5, selectable objects may include the content flag 402 and/or areas of a photosphere virtual reality view that may be selected by the targeting reticle 502.

A hardware implemented reticle behavior controller 128 may operate in conjunction with the camera operator controller 122 to control a behavior of the targeting reticle 502. The reticle behavior controller 128 may provide for the selection of an object, for example, in the virtual reality mode, when the targeting reticle 502 is positioned over an object for a predetermined time period.

Figure 6:
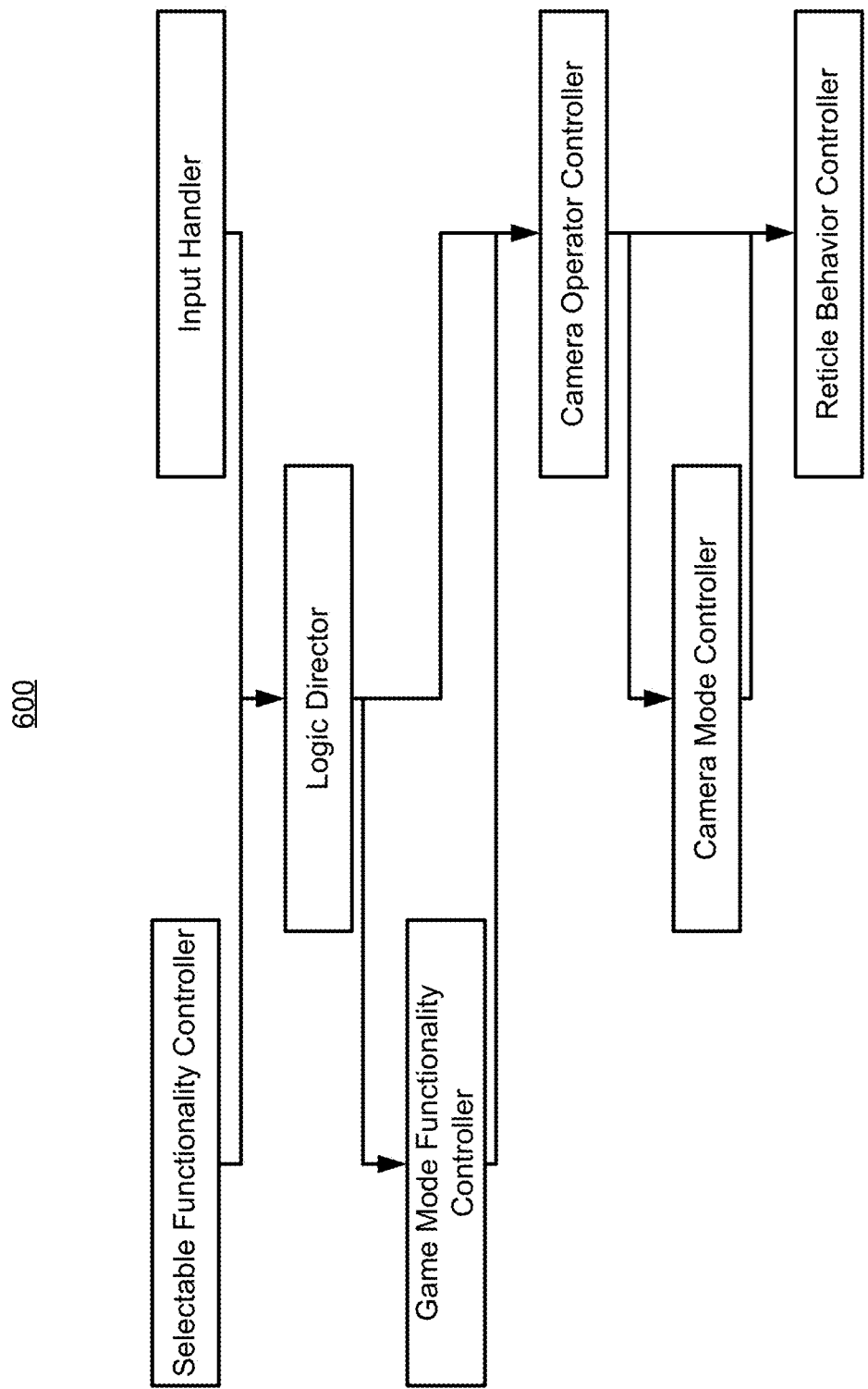
FIG. 6 illustrates a logic flow related to the three-dimensional virtualization system of FIG. 1, according to an example of the present disclosure.

FIG. 6 illustrates a logic flow 600 related to the system 100, according to an example of the present disclosure.

Referring to FIG. 6, various operations of the input handler 114, the logic director 118, the game mode functionality controller 120, the camera operator controller 122, the selectable functionality controller 124, the camera mode controller 126, and the reticle behavior controller 128 may be implemented in a logic flow diagram as classes (e.g., an input handler class, a logic director class, a game mode functionality controller class, a camera operator controller class, a selectable functionality controller class, a camera mode controller class, and a reticle behavior controller class). The classes of FIG. 6 may be sub-classed or extended to provide additional behavior, while inheriting all of the behavior of a higher level class. For example, a class for the game mode functionality controller 120 (i.e., the game mode functionality controller class) may be subclassed into a game mode map class, and a game mode photosphere view class. The game mode map class, and the game mode photosphere view class may include different delegates. The delegates may be used to pass functions between different classes. For example, game mode map may include a delegate related to dragging and/or twotouch. In order to modify a behavior of such a delegate, UpdateDelegates functionality may be used. For example, the game mode functionality controller 120 may use UpdateDelegates functionality to provide meaningful behavior to the input handler 114, the logic director 118, the selectable functionality controller 124, the camera operator controller 122, the camera mode controller 126, and the reticle behavior controller 128. An enter delegate in a map game mode may include different functionality compared to an enter delegate in a photosphere view game mode. Similarly, a drag delegate in a map game mode may include different functionality compared to a drag delegate in a photosphere view game mode. Further, a reset function may be called without entering a scene, and may not be called every time the scene is entered.

Figure 7:
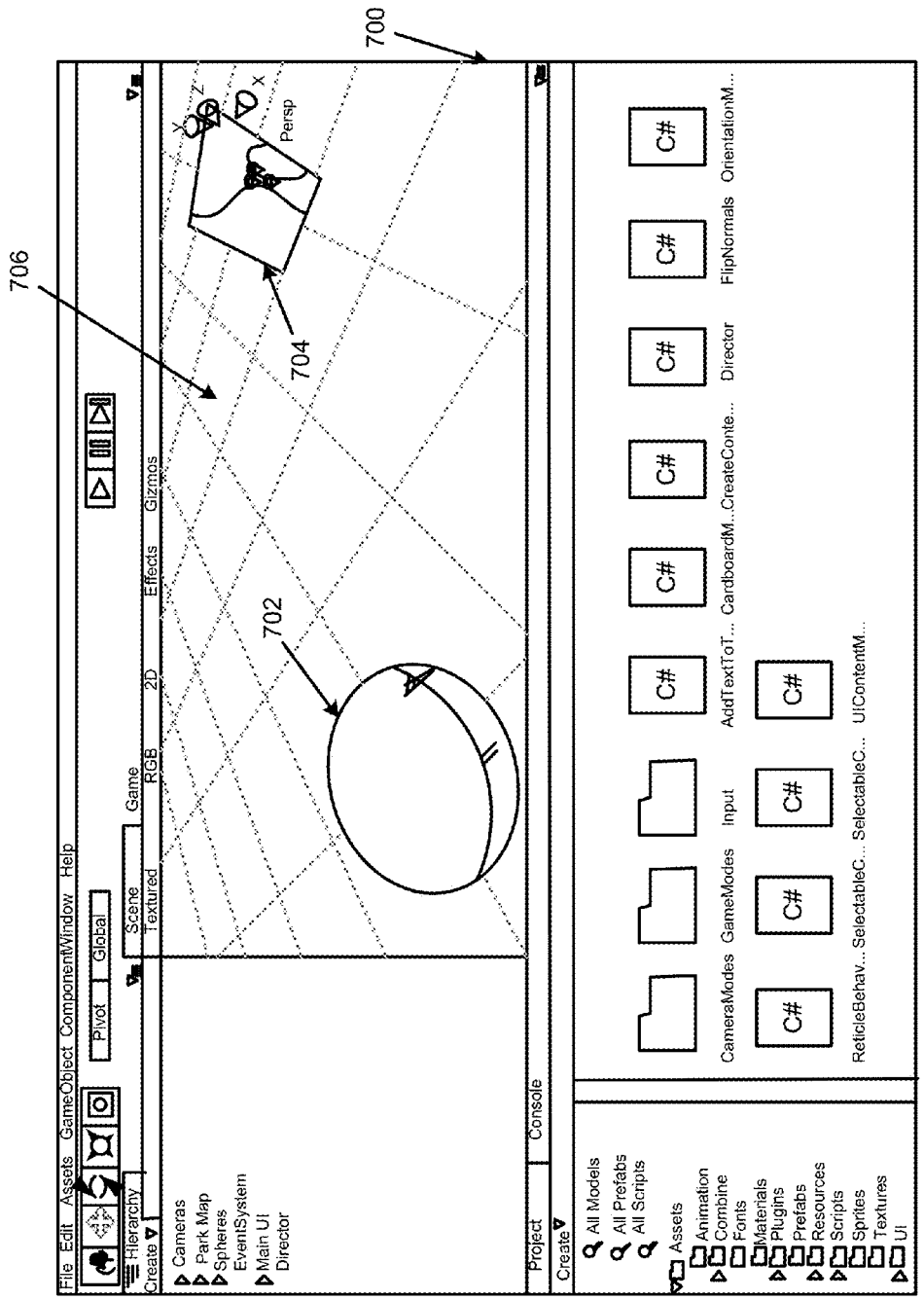
FIG. 7 illustrates a user-interface display for generating the virtual reality application by the three-dimensional virtualization system of FIG. 1, according to an example of the present disclosure.

FIG. 7 illustrates a user-interface display 700 of the system 100, according to an example of the present disclosure.

Referring to FIG. 7, in order to generate the virtual reality application 110, for example, to include a map and a photosphere view, a photosphere 702 and a map 704 may be dragged and dropped into a scene 706 (i.e., of a user-interface display of the system 100), with the virtual environments generated from the captured images 104 being dragged and dropped onto the photosphere 702.

Thereafter, game mode functionality controller scripts of the game mode functionality controller 120 may be dragged and dropped onto the photosphere 702 and map 704. The game mode functionality controller scripts may include the specific rule sets that are to be followed when in a particular game mode. A variety of game mode functionality controller scripts may be dragged onto objects to alter their behavior. For example, a subclassed script game mode photosphere functionality controller script may be dragged and dropped onto photospheres to implement desired behavior for photospheres. A game mode map functionality controller script may be dragged and dropped onto a map to implement desired behavior for a map.

Logic director and input handler scripts respectively of the logic director 118 and the input handler 114 may be added to an empty object. The input handler script may provide for the capturing of user input. For example, the input handler script may provide for the capturing of user input from a keyboard and mouse, a touch screen device (e.g., the display device 112), a gyroscope device, a linger-based selection, etc. The logic director script may include the instructions to translate inputs from the input handler script into directions for game objects and camera controllers. The empty object may be added to the scene and invisible to any rendering. The empty object may be used to give the scripts attached to it presence in the game world.

The selectable functionality controller script of the selectable functionality controller 124 may be added to a map pin, where the selectable functionality controller script may point to the photosphere 702. The selectable functionality controller script may include the machine readable instructions that implement the rules (as described herein) to select an object.

Based on these steps with respect to FIG. 7, the virtual reality application 110 may be generated without a user of the system 100 needing to write any machine readable instructions to generate the virtual reality application 110.

Figure 2:
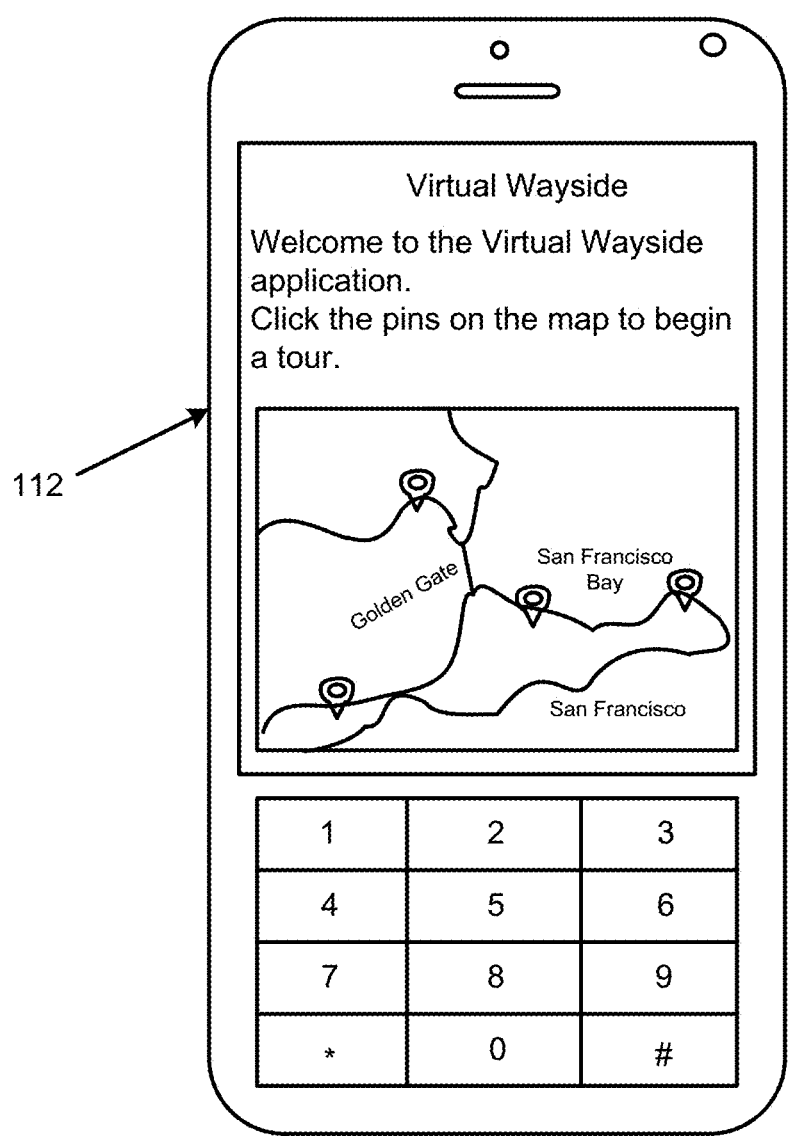
FIG. 2 illustrates a user-interface display of instructions for a virtual reality application generated by the three-dimensional virtualization system of FIG. 1, according to an example of the present disclosure.

Referring again to FIGS. 2-5, FIG. 2 illustrates a user-interface display of instructions for the system 100, according to an example of the present disclosure. Referring to FIG. 2, upon the execution of the virtual reality application 110, a main screen may be displayed. The main screen on the user-interface of the display device 112 may include instructions with respect to operation of the virtual reality application 110.

FIG. 3 illustrates a main user-interface display of a map for the system 100, according to an example of the present disclosure. Referring to FIG. 3, with respect to a map display on the user-interface of the display device 112, at the outset, the user 116 may be taken to a screen with a map. The map may include touchable areas (e.g., pins 300) that represent different locations the user may view. For example, the user may tap on the pin 300, and based on the tap, the user may be taken to the photosphere view 400.

FIG. 4 illustrates a user-interface display of the photosphere view 400 for the system 100, according to an example of the present disclosure. Referring to FIG. 4, assuming that the user taps on "Crissy Field" in the map display of FIG. 3, the photosphere view 400 may be generated as shown in FIG. 4, and manipulated through touching and dragging. Alternatively or additionally, the user may tap on a gyroscope mode option. For the gyroscope mode, the sensors of the display device 112 may be used to move the photosphere view 400 in relation to where the display device 112 is pointing in the real world. For example, assuming that the display device 112 is a picture frame, if the user 116 were to stand still and rotate the picture frame around and look through the picture frame, in a similar manner, the display device 112 may be used to move the photosphere view 400 in relation to where the display device 112 is pointing in the real world. The user 116 may also add annotated content to certain locations of the photosphere view 400. Alternatively or additionally, the content flags (e.g., at 402) may be used to add annotated content to certain locations of the photosphere view 400, and upon selection of the content flags, annotated content (e.g., at 404) may be displayed. The user 116 may also interact with the annotated content 404.

FIG. 5 illustrates a user-interface display of a photosphere virtual reality view 500 for the system 100, according to an example of the present disclosure. Referring to FIG. 5, the photosphere virtual reality view 500 may provide a virtual reality view when the display device 112 is used with a three-dimensional viewing device. When the display device 112 is used with the three-dimensional viewing device and combined with gyroscope control, the user 116 may receive a three-dimensional and immersive experience when viewing the photosphere virtual reality view 500. For the photosphere virtual reality view 500, the targeting reticle 502 may be used to provide for the user 116 to aim the display device 112 at a content flag (e.g., at 402), where the user 116 may aim the display device 112 at the content flag to retrieve any related content (e.g., pictures, text, etc.).

The elements of the system 100 may be machine readable instructions stored on a non-transitory computer readable medium. In this regard, the system 100 may include or be a non-transitory computer readable medium. In addition, or alternatively, the elements of the system 100 may be hardware or a combination of machine readable instructions and hardware, where the machine readable instructions may be executed by a hardware processor and/or other hardware elements.

Figure 8:
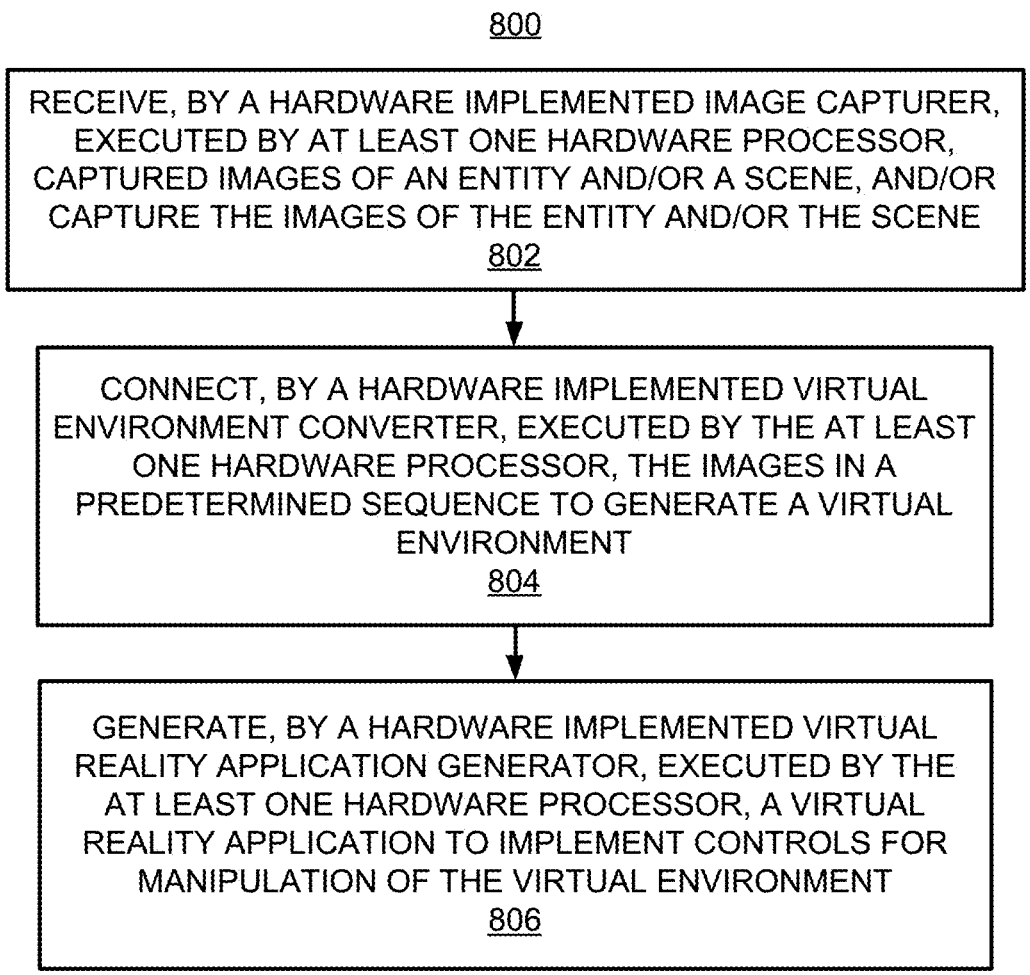
FIG. 8 illustrates a method for three-dimensional virtualization, according to an example of the present disclosure.
Figure 9:
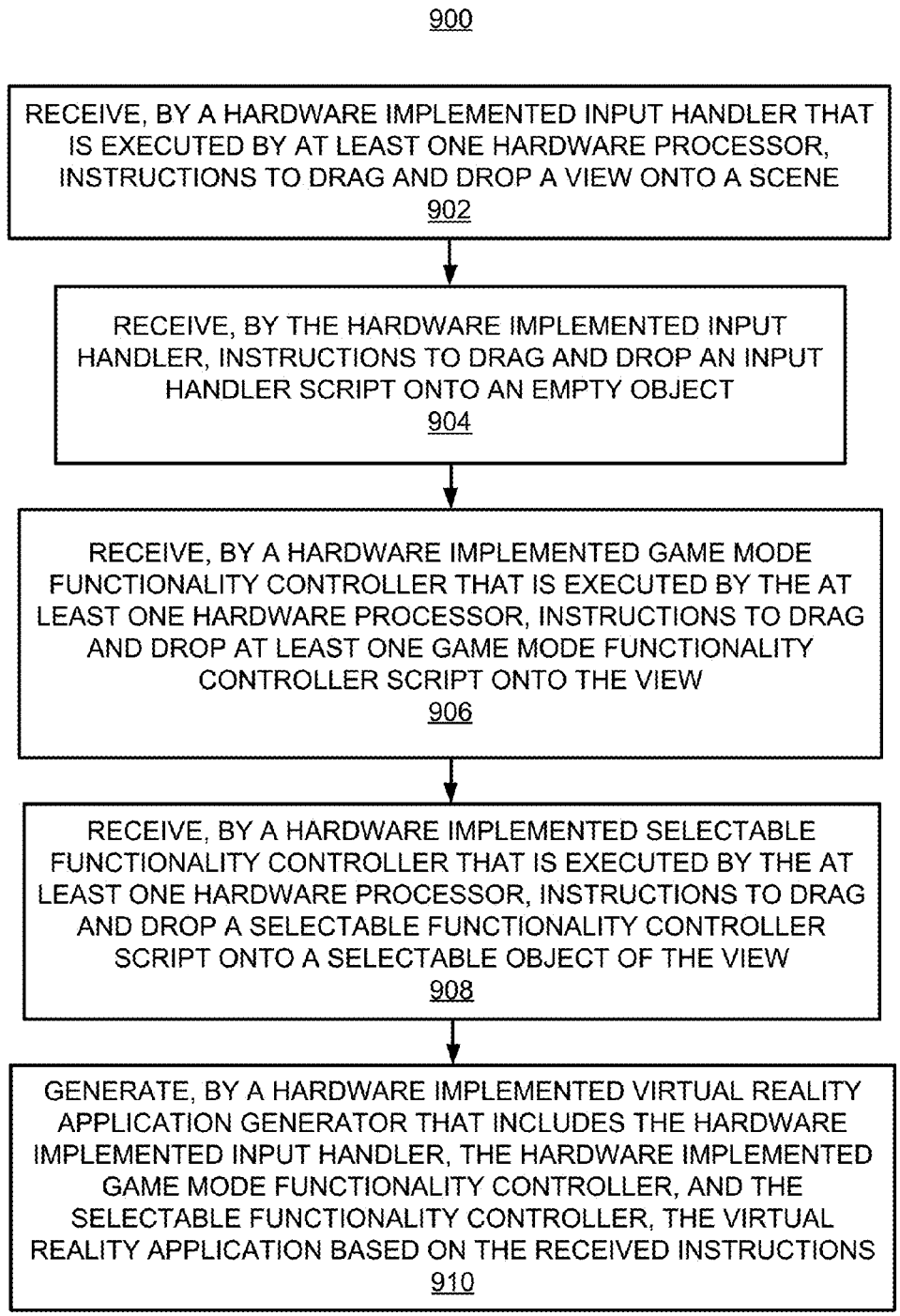
FIG. 9 illustrates further details of the method for three-dimensional virtualization, according to an example of the present disclosure.

FIGS. 8 and 9 illustrate flowcharts of methods 800 and 900 for three-dimensional virtualization, according to examples. The methods 800 and 900 may be implemented on the three-dimensional virtualization system 100 described above with reference to FIGS. 1-7 by way of example and not limitation. The methods 800 and 900 may be practiced in other systems.

Referring to FIGS. 1-8, at block 802, the method 800 may include receiving, by the hardware implemented image capturer 102 that is executed by at least one hardware processor, captured images 104 of an entity and/or a scene, and/or capturing the images 104 of the entity and/or the scene.

At block 804, the method 800 may include connecting, by the hardware implemented virtual environment converter 106 that is executed by the at least one hardware processor, the images 104 in a predetermined sequence to generate a virtual environment.

At block 806, the method 800 may include generating, by the hardware implemented virtual reality application generator 108 that is executed by the at least one hardware processor, the virtual reality application 110 to implement controls for manipulation of the virtual environment. The hardware implemented virtual reality application generator 108 may include the hardware implemented input handler 114 that is executed by the at least one hardware processor to receive gestures related to a view generated by the virtual reality application 110 (e.g., to manipulate the virtual environment), and translate the gestures to manipulate the view generated by the virtual reality application 110.

According to an example, for the method 800, the gestures may include touch gestures related to contact with a display of the display device 112 used to display the view, and/or movement gestures related to movement of the display device 112.

According to an example, for the method 800, the movement gestures may include movement of the display device 112 to position the targeting reticle 502.

According to an example, for the method 800, the gestures may include a touch gesture, and the hardware implemented input handler 114 may receive the touch gesture related to the pin 300 displayed in the view generated by the virtual reality application 110, and translate the touch gesture to display the photosphere view 400 related to the pin 300 displayed in the view generated by the virtual reality application 110.

According to an example, for the method 800, the gestures may include a touch gesture, and the hardware implemented input handler 114 may receive the touch gesture related to the content flag 402 displayed in the view generated by the virtual reality application 110, and translate the touch gesture to display the content 404 related to the content flag 402 in the view generated by the virtual reality application 110.

According to an example, for the method 800, the gestures may include a movement of the display device 112 to position, for a predetermined time period, the targeting reticle 502 within the view generated by the virtual reality application 110. Further, the hardware implemented input handler 114 may receive an indication of the movement of the display device 112 to position, for the predetermined time period, the targeting reticle 502 within the view generated by the virtual reality application 110. The view may be a photosphere virtual reality view 500, and the hardware implemented input handler 114 may translate the movement of the display device 112 to position, for the predetermined time period, the targeting reticle 502 within the photosphere virtual reality view 500 generated by the virtual reality application 110 to display content related to an area selected by the targeting reticle 502.

According to an example, for the method 800, the gestures may include a rotation of the display device 112 relative to the view generated by the virtual reality application 110. Further, the hardware implemented input handler 114 may receive an indication of the rotation of the display device 112 relative to the view generated by the virtual reality application 110, and translate the rotation of the display device 112 relative to the view generated by the virtual reality application 110 to display a new view generated by the virtual reality application 110. The content (e.g., map content) displayed for the view generated by the virtual reality application 110 may different from content (e.g., photosphere view content) displayed for the new view generated by the virtual reality application 110.

According to an example, the method 800 may further include determining, by the hardware implemented logic director 118 that is executed by the at least one hardware processor, a validity of a gesture of the gestures related to the view generated by the virtual reality application 110 based on a comparison of the gesture to a control mode of a plurality of control modes that include a gyroscopic-based control mode, a finger-based control mode, and a linger-based control mode.

According to an example, the method 800 may further include implementing, by the hardware implemented selectable functionality controller 124 that is executed by the at least one hardware processor, a plurality of different functionalities in a selectable object of a set of selectable objects based on attributes of the selectable objects, and/or a particular game mode of a plurality of game modes that the selectable object is being used in. The game modes may be related to different views including the view generated by the virtual reality application 110.

According to an example, for the method 800, the plurality of game modes may include at least two of a welcome screen game mode, a map view game mode, and a photosphere view game mode, and the selectable object may include the pin 300 and/or the content flag 402.

According to an example, the method 800 may further include implementing, by the hardware implemented game mode functionality controller 120 that is executed by the at least one hardware processor, based on a set of rules, a functionality from a plurality of different functionalities in a game mode of a plurality of game modes. According to an example, the plurality of game modes may include a map view game mode and a photosphere view game mode. According to an example, a rule of the set of rules may include a determination of implementation of a gesture of the gestures that include touch, touch and drag, and two finger touch based on the game mode of the plurality of game modes.

According to an example, the method 800 may further include implementing, by the hardware implemented camera operator controller 122 that is executed by the at least one hardware processor, a camera setting from a plurality of available camera settings based on a particular game mode of a plurality of game modes. For example, the camera settings may include a gyroscopic mode camera setting, a finger mode camera setting, and/or a virtual reality camera setting. The plurality of game modes may include a welcome screen game mode, a map view game mode, and/or a photosphere view game mode. According to an example, in a map view game mode, the gyroscopic mode camera setting may not be allowed, but the finger mode camera setting, and the virtual reality camera setting may be allowed. According to another example, in a photosphere view game mode, all three types of camera settings may be allowed. In other types of game modes, custom rules may be implemented with respect to the camera settings that are allowed.

According to an example, for the method 800, the hardware implemented virtual reality application generator 108 may generate, based on the user 116 selection, the virtual reality application 110 for deployment on a platform from a plurality of available platforms that include a personal computer, a tablet, and a smartphone.

Referring to FIGS. 1-7 and 9, at block 902, the method 900 may include receiving, by the hardware implemented input handler 114 that is executed by at least one hardware processor, instructions to drag and drop a view onto the scene 706. The view may include the images 104 that are connected in a predetermined sequence to generate a virtual environment.

At block 904, the method 900 may include receiving, by the hardware implemented input handler 114, instructions to drag and drop an input handler script onto an empty object. The input handler script may ascertain a gesture to manipulate the virtual environment, and the empty object may implement the input handler script in a virtual reality application.

At block 906, the method 900 may include receiving, by the hardware implemented game mode functionality controller 120 that is executed by the at least one hardware processor, instructions to drag and drop at least one game mode functionality controller script onto the view. The game mode functionality controller script may include a rule that is to be implemented during execution of a game mode.

At block 908, the method 900 may include receiving, by the hardware implemented selectable functionality controller 124 that is executed by the at least one hardware processor, instructions to drag and drop a selectable functionality controller script onto a selectable object of the view. The selectable functionality controller script may include a rule that is to be implemented to select the selectable object.

At block 910, the method 900 may include generating, by the hardware implemented virtual reality application generator 108 that includes the hardware implemented input handler 114, the hardware implemented game mode functionality controller 120, and the selectable functionality controller 124, the virtual reality application 110 based on the received instructions. The virtual reality application 110 may implement controls for manipulation of the virtual environment based on the received instructions.

According to an example, a method for three-dimensional virtualization may include generating, by the hardware implemented virtual reality application generator 108 that is executed by the at least one hardware processor, the virtual reality application 110 to implement controls for manipulation of a virtual environment that includes a plurality of the images 104 connected together in a predetermined sequence. The method may further include receiving, by the hardware implemented input handler 114, of the hardware implemented virtual reality application generator 108, that is executed by the at least one hardware processor, gestures related to a view generated by the virtual reality application 110. The gestures may include touch gestures related to contact with a display of the display device 112 used to display the view, and/or movement gestures related to movement of the display device 112. The method may further include translating the gestures to manipulate the view generated by the virtual reality application 110.

Figure 10:
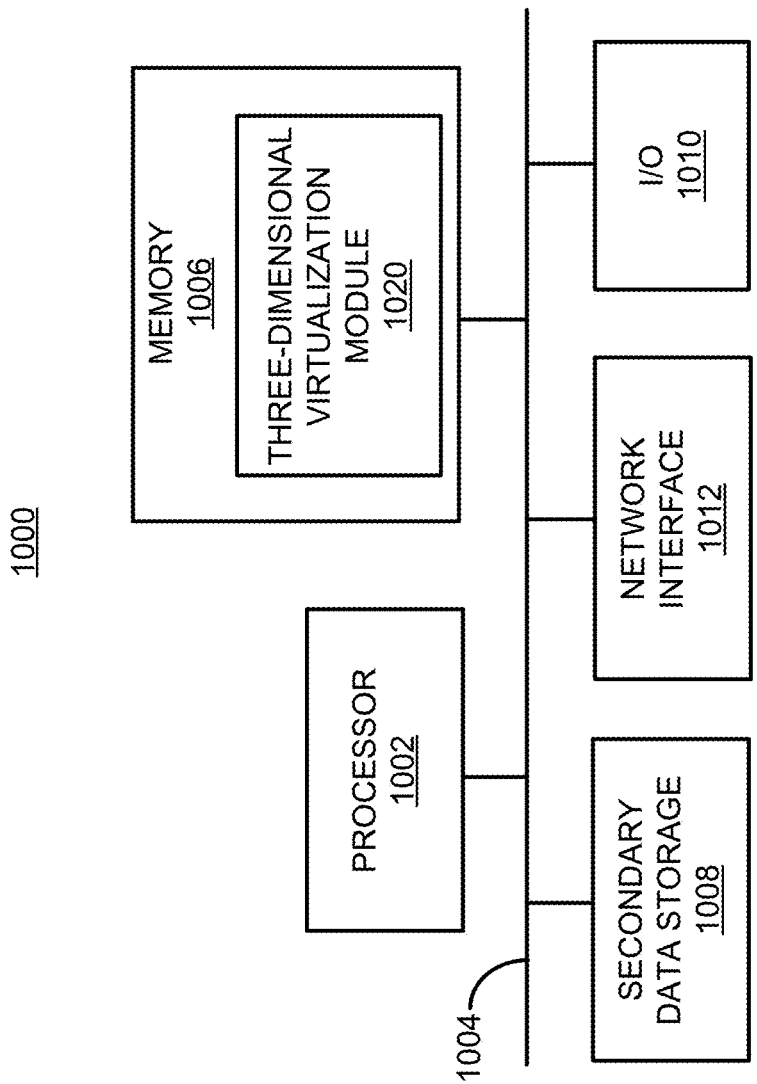
FIG. 10 illustrates a computer system, according to an example of the present disclosure.

FIG. 10 shows a computer system 1000 that may be used with the examples described herein. The computer system may represent a generic platform that includes components that may be in a server or another computer system. The computer system 1000 may be used as a platform for the system 100. The computer system 1000 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1000 may include a processor 1002 that may implement or execute machine readable instructions performing some or all of the methods, functions and other processes described herein. Commands and data from the processor 1002 may be communicated over a communication bus 1004. The computer system may also include a main memory 1006, such as a random access memory (RAM), where the machine readable instructions and data for the processor 1002 may reside during runtime, and a secondary data storage 1008, which may be non-volatile and stores machine readable instructions and data. The memory and data storage are examples of computer readable mediums. The memory 1006 may include a three-dimensional virtualization module 1020 including machine readable instructions residing in the memory 1006 during runtime and executed by the processor 1002. The three-dimensional virtualization module 1020 may include the elements of the system 100 shown in FIG. 1.

The computer system 1000 may include an I/O device 1010, such as a keyboard, a mouse, a display, etc. The computer system may include a network interface 1012 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A three-dimensional virtualization system comprising:
    an image capturer, executed by at least one hardware processor, to at least one of
        receive captured images of at least one of an entity and a scene, and
        capture the images of the at least one of the entity and the scene;
    a virtual environment converter, executed by the at least one hardware processor, to connect the captured images in a predetermined sequence to generate a virtual environment; and
    a virtual reality application generator, executed by the at least one hardware processor, to generate a virtual reality application to implement controls for manipulation of the virtual environment, wherein the virtual reality application generator comprises
        an input handler, executed by the at least one hardware processor, to
            receive gestures related to a view generated by the virtual reality application, wherein the gestures include at least one of
                touch gestures related to contact with a display of a display device used to display the view, and
                movement gestures related to movement of the display device to position a targeting reticle, and
            translate the gestures to manipulate the view generated by the virtual reality application.

2. The three-dimensional virtualization system according to claim 1, wherein for a touch gesture of the touch gestures, the input handler is to
    receive the touch gesture related to a pin displayed in the view generated by the virtual reality application, and
    translate the touch gesture to display a photosphere view related to the pin displayed in the view generated by the virtual reality application.

3. The three-dimensional virtualization system according to claim 1, wherein for a touch gesture of the touch gestures, the input handler is to
    receive the touch gesture related to a content flag displayed in the view generated by the virtual reality application, and
    translate the touch gesture to display content related to the content flag in the view generated by the virtual reality application.

4. The three-dimensional virtualization system according to claim 1, wherein the gestures include the movement of the display device to position, for a predetermined time period, the targeting reticle within the view generated by the virtual reality application, and wherein the input handler is to
    receive an indication of the movement of the display device to position, for the predetermined time period, the targeting reticle within the view generated by the virtual reality application, wherein the view is a photosphere virtual reality view, and
    translate the movement of the display device to position, for the predetermined time period, the targeting reticle within the photosphere virtual reality view generated by the virtual reality application to display content related to an area selected by the targeting reticle.

5. The three-dimensional virtualization system according to claim 1, wherein the gestures include a rotation of the display device relative to the view generated by the virtual reality application, and wherein the input handler is to
    receive an indication of the rotation of the display device relative to the view generated by the virtual reality application, and
    translate the rotation of the display device relative to the view generated by the virtual reality application to display a new view generated by the virtual reality application, wherein content displayed for the view generated by the virtual reality application is different from content displayed for the new view generated by the virtual reality application.

6. The three-dimensional virtualization system according to claim 1, further comprising a logic director, executed by the at least one hardware processor, to
    determine a validity of a gesture of the gestures related to the view generated by the virtual reality application based on a comparison of the gesture to a control mode of a plurality of control modes that include a gyroscopic-based control mode, a finger-based control mode, and a linger-based control mode.

7. The three-dimensional virtualization system according to claim 1, further comprising a selectable functionality controller, executed by the at least one hardware processor, to
    implement a plurality of different functionalities in a selectable object of a set of selectable objects based on at least one of
        attributes of the selectable objects, and
        a particular game mode of a plurality of game modes that the selectable object is being used in, wherein the game modes are related to different views including the view generated by the virtual reality application.

8. The three-dimensional virtualization system according to claim 7, wherein
    the plurality of game modes include at least two of a welcome screen game mode, a map view game mode, and a photosphere view game mode, and
    the selectable object includes at least one of a pin and a content flag.

9. The three-dimensional virtualization system according to claim 1, further comprising a game mode functionality controller, executed by the at least one hardware processor, to
    implement, based on a set of rules, a functionality from a plurality of different functionalities in a game mode of a plurality of game modes, wherein the plurality of game modes include a map view game mode and a photosphere view game mode, and wherein a rule of the set of rules includes a determination of implementation of a gesture of the gestures that include touch, touch and drag, and two finger touch based on the game mode of the plurality of game modes.

10. The three-dimensional virtualization system according to claim 1, further comprising a camera operator controller, executed by the at least one hardware processor, to implement a camera setting from a plurality of available camera settings based on a particular game mode of a plurality of game modes, wherein the camera settings include at least two of a gyroscopic mode camera setting, a finger mode camera setting, and a virtual reality camera setting, wherein the plurality of game modes include at least two of a welcome screen game mode, a map view game mode, and a photosphere view game mode, and wherein the map view game mode includes the finger mode camera setting and the virtual reality camera setting.

11. The three-dimensional virtualization system according to claim 1, wherein the virtual reality application generator is to generate, based on a user selection, the virtual reality application for deployment on a platform from a plurality of available platforms that include a personal computer, a tablet, and a smartphone.

12. A method for three-dimensional virtualization, the method comprising:
receiving, by an input handler that is executed by at least one hardware processor, instructions to drag and drop a view onto a scene, wherein the view includes images that are connected in a predetermined sequence to generate a virtual environment;
receiving, by the input handler, instructions to drag and drop an input handler script onto an empty object, wherein the input handler script is to ascertain a gesture to manipulate the virtual environment, and wherein the empty object is to implement the input handler script in a virtual reality application;
receiving, by a game mode functionality controller that is executed by the at least one hardware processor, instructions to drag and drop at least one game mode functionality controller script onto the view, wherein the game mode functionality controller script includes a rule that is to be implemented during execution of a game mode;
receiving, by a selectable functionality controller that is executed by the at least one hardware processor, instructions to drag and drop a selectable functionality controller script onto a selectable object of the view, wherein the selectable functionality controller script includes a rule that is to be implemented to select the selectable object; and
generating, by a virtual reality application generator that includes the input handler, the game mode functionality controller, and the selectable functionality controller, the virtual reality application based on the received instructions, wherein the virtual reality application is to implement controls for manipulation of the virtual environment based on the received instructions.

13. A non-transitory computer readable medium having stored thereon machine readable instructions for three-dimensional virtualization, the machine readable instructions when executed cause at least one hardware processor to:
generate, by a virtual reality application generator that is executed by the at least one hardware processor, a virtual reality application to implement controls for manipulation of a virtual environment that includes a plurality of images connected together in a predetermined sequence;
receive, by an input handler, of the virtual reality application generator, that is executed by the at least one hardware processor,
gestures related to a view generated by the virtual reality application, wherein the gestures include at least one of
touch gestures related to contact with a display of a display device used to display the view, and
movement gestures related to movement of the display device, and
translate the gestures to manipulate the view generated by the virtual reality application, wherein for the display device that is to display the view generated by the virtual reality application, the input handler is to
receive an indication of a movement of the display device to position, for a predetermined time period, a targeting reticle within the view generated by the virtual reality application, wherein the view is a photosphere virtual reality view, and
translate the movement of the display device to position, for the predetermined time period, the targeting reticle within the photosphere virtual reality view generated by the virtual reality application to display content related to an area selected by the targeting reticle.

14. The non-transitory computer readable medium according to claim 13, wherein the input handler is to
receive a touch gesture of the touch gestures related to a pin displayed in the view generated by the virtual reality application, and
translate the touch gesture to display a photosphere view related to the pin displayed in the view generated by the virtual reality application.

15. The non-transitory computer readable medium according to claim 13, wherein the input handler is to
receive a touch gesture of the touch gestures related to a content flag displayed in the view generated by the virtual reality application, and
translate the touch gesture to display content related to the content flag in the view generated by the virtual reality application.

16. The non-transitory computer readable medium according to claim 13, wherein for the display device that is to display the view generated by the virtual reality application, the input handler is to
receive an indication of a rotation of the display device relative to the view generated by the virtual reality application, and
translate the rotation of the display device relative to the view generated by the virtual reality application to display a new view generated by the virtual reality application, wherein content displayed for the view generated by the virtual reality application is different from content displayed for the new view generated by the virtual reality application.

17. The non-transitory computer readable medium according to claim 13, wherein the virtual reality application generator is to
generate, based on a user selection, the virtual reality application for deployment on a platform from a plurality of available platforms that include a personal computer, a tablet, and a smartphone.

18. The non-transitory computer readable medium according to claim 13, wherein the machine readable instructions when executed further cause the at least one hardware processor to:
  determine, by logic director that is executed by the at least one hardware processor, a validity of a gesture of the gestures related to the view generated by the virtual reality application based on a comparison of the gesture to a control mode of a plurality of control modes that include a gyroscopic-based control mode, a finger-based control mode, and a linger-based control mode.

19. The non-transitory computer readable medium according to claim 13, wherein the machine readable instructions when executed further cause the at least one hardware processor to:
  implement, by selectable functionality controller that is executed by the at least one hardware processor, a plurality of different functionalities in a selectable object of a set of selectable objects based on at least one of
    attributes of the selectable objects, and
    a particular game mode of a plurality of game modes that the selectable object is being used in, wherein the game modes are related to different views including the view generated by the virtual reality application.

20. The non-transitory computer readable medium according to claim 19, wherein
  the plurality of game modes include at least two of a welcome screen game mode, a map view game mode, and a photosphere view game mode, and
  the selectable object includes at least one of a pin and a content flag.

* * * * *